United States Patent [19]
Gaerttner et al.

[11] 4,290,861
[45] Sep. 22, 1981

[54] GROWTH OF OXIDE FILMS BY VAPOR SOLID STATE ANODIZATION

[75] Inventors: Martin R. Gaerttner, Dearborn; Robert C. Jaklevic, Birmingham, both of Mich.

[73] Assignee: Ford Motor Company, Dearborn, Mich.

[21] Appl. No.: 58,041

[22] Filed: Jul. 16, 1979

[51] Int. Cl.³ .................... C25D 11/04; C25D 11/06; C25D 11/26
[52] U.S. Cl. .................................. 204/56 R; 204/58; 204/130
[58] Field of Search .................... 204/58, 56 R, 56 M, 204/130

[56] References Cited
U.S. PATENT DOCUMENTS
2,540,602  2/1951  Thomas et al. ........................ 204/58
2,567,877  9/1951  Ment ................................... 204/58

OTHER PUBLICATIONS
"Solid State Oxidation of TA" by D. M. Smyth, J. Electrochem, 113, 19(1966) pp. 19-24.
"The Formation of Metal Oxide Films Using Gaseous & Solid Electrolytes", J. L. Miles & P. H. Smith, J.E.C.S. 110, 1240, 1966.

Primary Examiner—R. L. Andrews
Attorney, Agent, or Firm—Peter D. McDermott; Olin B. Johnson

[57] ABSTRACT
A method of solid state anodization comprising contacting a solid anode with a solid insulator that separates and contacts the anode and a solid permeable cathode whereby an oxidant infuses through the permeable cathode while the anode is biased sufficiently positive to cause anodization.

7 Claims, 2 Drawing Figures

GROWTH OF OXIDE FILMS BY VAPOR SOLID STATE ANODIZATION

BACKGROUND OF THE INVENTION

Electrochemical processes that form oxide films on such metals as aluminum, tantalum, niobium, etc. using liquid electrolyte are well known. See, for example, "Anodic Oxide Film", L. Young, Academic Press, London, New York, 1961.

Also, other anodization techniques have been also proposed. For example, Smyth suggests in "Solid-State Anodic Oxidation" (*Journal of Electrochemistry*, 113, 19 (1966) that anodization may be made to occur at the expense of local oxygen content of $MnO_2$ in a $Ta$-$Ta_2O_5$-$MnO_2$ solid electrolyte capacitor. Moreover, Miles and Smith suggest in "The Formation of Metal Oxide Films Using Gaseous and Solid Electrolytes" (*Journal of Electrochemical Society*) 110, 1240 (1966)) that anodization may be made to occur, among other ways, by transport of oxygen dissolved in metal deposited on an oxidized, anodizable conductor.

This invention differs from these earlier disclosures in that anodization occurs when external oxidant infuses through a permeable conductor to a solid interfacial region between electrodes.

BRIEF DESCRIPTION OF THE DRAWINGS

In FIG. 1, $M_1$ is an anodizable metal; $M_2$ is a permeable conducting cathode; and the oxide is an oxide of $M_1$ that acts as insulator between $M_1$ and $M_2$. In anodization in accordance with this embodiment, exposure to oxidant vapor as, for example, water vapor in air, permits infusion of oxidant through the permeable conductor. Upon application of positive bias to the anode, anodization occurs with consequent increase in oxide in the interfacial region between the electrodes.

THE INVENTION

Figure 1:
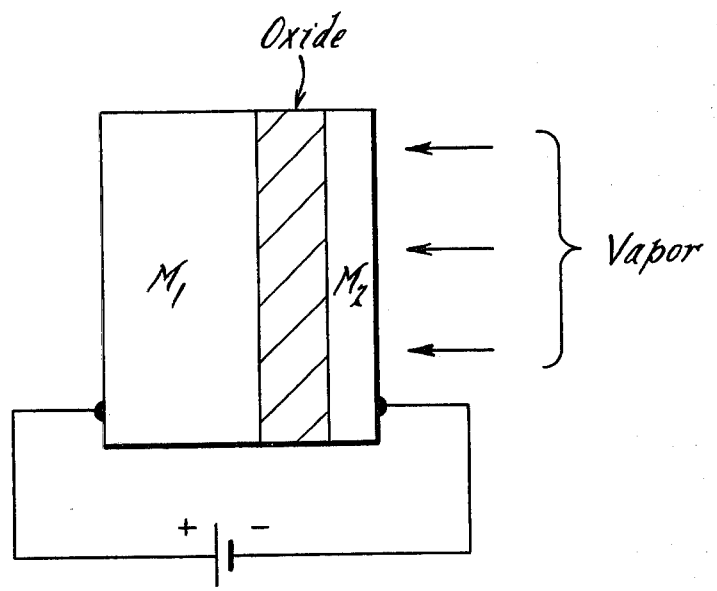
FIG. 1 shows in schematic form for illustration one embodiment of this invention.

This invention relates to anodization wherein oxidant infuses through a permeable cathode and reacts at a solid, interfacial insulating region in contact with the electrodes upon application of sufficient positive bias. Anodization continues with further incremental biases.

Thus, for example, this invention includes anodization in capacitor devices such as $M_1$-$M_1$ oxide-$M_2$, wherein $M_1$ is an anode; $M_1$ oxide is an oxide layer on $M_1$; and $M_2$ is a permeable cathode overlay. Anodization in these type of devices begins, for example, with exposure of oxidant e.g., water vapor, to the permeable cathode overlay and infusion therethrough. Application of recurrent, incremental positive bias to the anode causes anodization. The oxide layer grows during anodization with consequent increase in resistance and decrease in capacitance.

DETAILED DESCRIPTION OF THE INVENTION

A vast number of solid, electrically conducting substances are known to oxidize so as to serve as useful anodes. For example, a variety of metals are known as anodizable and may serve as anodes in this invention. Examples of such metals include aluminum, hafnium, beryllium, tantalum, niobium and the like, and desirably, in one embodiment those metals which are commonly known as valve metals and form stable oxides. Such metals may serve as an element in certain devices of this invention after anodization, or, alternatively, may serve as sacrificial anode.

Many techniques are available to develop suitable anodes. These techniques are dependent to large extent upon end use of the device. One method for reproducible devices having anodizable metals entails vapor deposition at less than about $10^{-6}$ Torr. Thickness of the deposited metallic film is, of course, dependent upon end use again and may range, for example, from under 50 Å, e.g. 20 Å, up to several thousand or more Å.

Between the anode and permeable cathode is devices of this invention, there is a solid insulator that is ionically conductive at anodizing conditions. The insulator may be an oxide of the anode and formed by growth or other deposition of an initial oxide layer on the anode. For example, exposure of anode metal to oxygen in electrical discharge or exposure to oxygen with a few percent water vapor are oxide growth routes. Control of the amount of oxide growth may be accomplished by control of, for example, factors as temperature, exposure time and discharge level. The initial oxide layer is sufficiently thick to prevent undesired electrical contact with the solid permeable cathode in areas of interest.

After deposition or growth of oxide or other like insulator, there is application of a permeable cathode overlay onto at least a portion of the insulator. The cathode may be any suitable conductor including metallic, semi-conducting, organic or inorganic. Vacuum deposition of metals serves as convenient means for application of metallic overlay. Among the many suitable candidates for the permeable conductors are lead, tin, gold and other such metals that (1) at suitable thickness similarly allow infusion of vapor such as water vapor and (2) are resistant to attack by the oxidant at anodization conditions. Typically, a thickness between about 200–20,000 Å for lead, tin, gold or the like, gives conductor overlays of desirable permeability. In such overlays, it is believed the oxidant infuses through the permeable conductor via grain boundaries.

As mentioned, oxidant infuses through the permeable conductor to the interfacial region between the permeable conductor and anode. Upon application of sufficient positive bias to the anode, reaction occurs.

The oxidant has certain characteristics. For example, it is fluid and adsorbs onto the permeable conductor prior to infusion. Furthermore, it should be of a molecular size to permit its travel through the permeable cathode as through grain boundaries. For example, although one might expect pure oxygen to be readily infused, it is found that such is not necessarily the case. On the other hand, water with its highly polar character is readily adsorbed and infused and acts as oxidant with such cathode metals as lead, gold and tin. Indeed, in many cases, the adsorbed water also acts as solvent and permits infusion of compounds which by themselves are not infusible under similar conditions.

Preferred currently then for anodization in accordance with this invention is exposure to gaseous oxidant comprising water vapor. Water vapor and air as, for example, air at relative humidites of about 60–100% provide desirable anodization conditions. It is desired in some instances, however, to insure slightly less than 100% relative humidity. Otherwise, condensing water vapor (due, for example, to temperature fluctuations) may injure certain permeable cathodes as lead at certain anodization conditions.

Application of a positive bias to the anode permits initial anodization, when there is exposure of the permeable cathode to the oxidant. The positive bias may be initially low levels, e.g. less than one volt, while still providing in some instances anodization when the oxidant comprises water vapor.

Initial anodization may proceed at low rates if resistance provided by the interfacial region does not support higher biases. At lower resistances and biases (e.g. below one volt) the current carrying is mainly election tunneling. At higher, protective resistances (e.g. about 1000 ohm), the current carrying mechanism is ionic. Therefore, the higher biases permit considerably more rapid anodization. Successively higher biases cause rapid rise in resistance due to oxide growth. Resistances can, upon successively higher biases, proceed from kilo-ohms to megaohms and higher.

The following examples illustrate aspects of this invention. The details of these examples are not meant as limiting the scope of this invention.

EXAMPLES

These examples illustrate electrode preparation using thin film evaporation methods in moderately clean vacuum of less than $10^{-6}$ Torr at room temperature.

Evaporation through a mask of aluminum continues until a two millimeter strip of aluminum is 600 Å thick on a glazed ceramic. Then, exposure for about five minutes to an electrical discharge in pure oxygen at a pressure of 0.2 Torr, 500 volts d.c. at 10 ma causes growth of an initial oxide layer of between about 15–30 Å thick.

After pumpdown, there is evaporative deposition of overlay film. In certain of the samples, there is deposition of lead; in others, there is deposition of gold. The lead film, deposited also through a mask, is about 600 Å thick and two millimeters wide; the gold film is about 100 Å thick and similar width. Deposition in either case takes about thirty seconds.

After removal of the completed devices, storage is in dry air until use. Thereafter, the initial measured resistances range from less than a few ohms to several hundred ohms.

For anodization, the samples are mounted in a Pyrex bottle with electrical contacts brought in from the outside and attached to the films by a small amount of indium solder. Gas is passed through the chamber at a rate of about 1 liter/minute and either oxygen or argon is used. The relative humidity is adjusted by passing a part of the gas flow through a bubbler with pure $H_2O$ and mixing to proportion by means of two precision flow meters. Relative humidity in the range 90–100% is employed consistantly in this example. The d.c. anodizing current is provided either with constant voltage or constant current and the current in most cases is maintained less than 20μa. Initially, the junctions prepared are of low resistance so that only a few tenths of a volt could be applied without burning out the device. Over this range of resistance (zero to several thousand ohms) little or no anodization is observed. (However, for Pb overlay, the resistance increases if exposed for many hours to a humid atmosphere.) When a resistance of approximately one kohm is attained, voltages of one volt could be sustained without destruction to the junction and rapid anodization could be made to occur. With a d.c. voltage of one volt or more applied, a rapid growth in d.c. resistance occurs. The resistance increases gradually to the range of tens of kilohms and to megaohms for still higher anodizing voltages. Even for voltages above one volt, electronic current can also contribute to the conduction so that actual anodization efficiency was not known. Consequently, oxide thickness is calculated from the capacitance values obtained after anodizing at a given voltage until the current decays to a low value.

Figure 2:
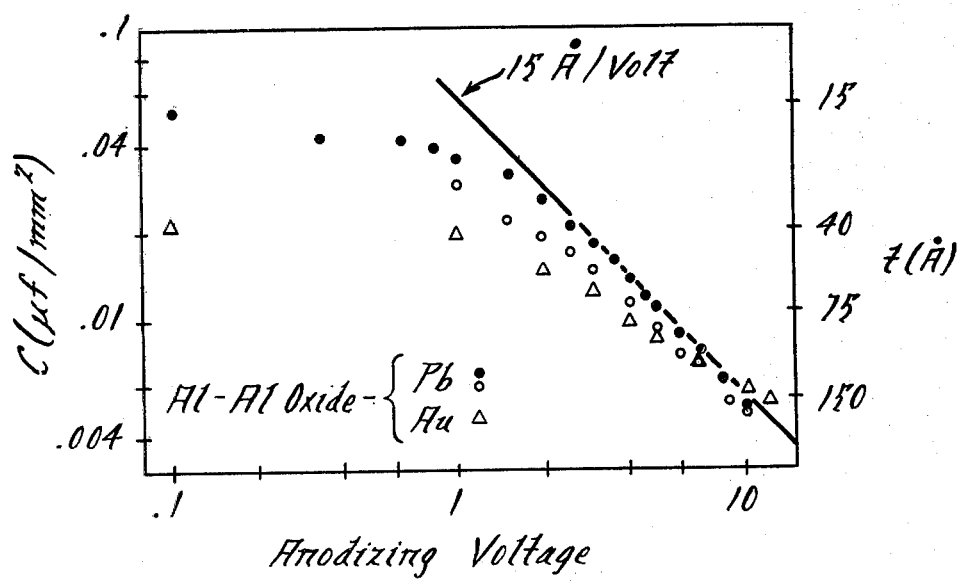
FIG. 2 illustrates relationship between anodizing voltage and (1) oxide thickness in angstroms (Å) as well as (2) capacitance with devices as illustrated in FIG. 1 and as more completely described in Example 1.

A typical plot of junction capacitance (and the corresponding oxide thickness) for two Al-Al oxide -Pb junctions is shown in FIG. 2. As can be seen, there is no appreciable dependence of capacitance on voltage for less than one volt even though the voltages are sustained for as long as one hour. The initial capacitance is due to the presence of the initial oxide layer and the conduction mechanism is likely electron tunneling. Above one volt, the initial d.c. current of 20 μa or more decays to less than few μa in a minute or more. Each time the voltage is increase again the current decays to a small value in a few minutes. Above six volts the decay time increases to about ten minutes and continues to increase with voltage. Anodizing voltages as high as 30 V are employed but the risk of destructive burnout greatly increases beyond 15 V.

The rate of decay decreases rapidly with lowered humidity. If the relative humidity is reduced to near zero, current decay is not observed and no resistance increase or capacitance change occurs. Substantially the same behavior is observed with either argon or $O_2$ as the ambient gas.

The thickness scale (t) in FIG. 2 is obtained directly from the capacitance values using K=9 for the oxide dielectric constant. As FIG. 2 shows, there is a nearly linear relationship between voltage and oxide thickness above one volt with a proportionality factor of about 15 Å/volt.

Similar results are obtained for Au overlay films.

What is claimed is:

1. A method of solid state anodization using fluid infusion which comprises:
   (A) providing:
   1. a solid anode,
   2. a solid permeable cathode, and
   3. a solid insulator that separates and contacts the anode and permeable cathode;
   (B) contacting the permeable cathode with an oxidant that infuses through the permeable cathode; and
   (C) biasing the anode sufficiently positive to cause the anodization.

2. The method in accordance with claim 1, wherein the insulator comprises an oxide of the anode.

3. The method in accordance with claim 1, wherein the anode comprises metal.

4. The method in accordance with claim 3, wherein metal is selected from the group consisting of aluminum, tantalum, zirconium, hafnium, and beryllium.

5. The method in accordance with claims 1 or 2 or 3 or 4, wherein the oxidant comprises water.

6. The method in accordance with claim 5, wherein the permeable cathode comprises lead or gold.

7. The method in accordance with claim 6, wherein the anode comprises aluminum.

* * * * *